Patented Feb. 4, 1936

2,029,588

UNITED STATES PATENT OFFICE 2,029,588

FILM-FORMING COMPOSITIONS

Leo Rosenthal, Leverkusen-Wiesdorf, and Reinhard Hebermehl, Cologne-Deutz, Germany, assignors to I. G. Farbenindustrie Aktiengesellschaft, Frankfort-on-the-Main, Germany No Drawing. Application November 27, 1933, Serial No. 700,022. In Germany December 6, 1932

5 Claims. (Cl. 134—17)

The present invention relates to new film-forming compositions and, in particular, to improvements in film-forming compositions essentially containing chlorinated rubber materials.

It is well known that chlorinated rubber materials, that is products obtained by the chlorination of natural or synthetic rubber, balata, guttapercha and the like, until the products contain from about 55 to about 70% by weight of chlorine, can be employed as bases for artificial masses and for coating compositions. The compositions hitherto prepared, which usually contain some softening agents, as for example, drying oils, do not fulfill, however, all requirements.

We have now found that compositions, showing a particularly high resistance against chemical attack, as for example, by strong acids, alkalies and salts, or their solutions respectively, as well as by distilled water and highly dilute aqueous solutions of salts, can be obtained by incorporating chlorinated rubber materials with the sulfur bearing, generally oily products obtainable by the interaction of sulfur on at least one of the aliphatic homologues of benzene, especially those containing from 1 to 2 alkyl groups, as for example, toluene, xylene or ethyl benzene, in the presence of small quantities of aluminium chloride. These more or less oily reaction products may be obtained, for example, as described in the German Patents 365,169 and 376,718, or the U. S. Patents Nos. 1,426,430 and 1,427,182.

The said reaction products may be incorporated with the chlorinated rubber either as such or together with solvents, whereby, depending on the quantity of the said reaction products and of any solvent employed, more or less solid, plastic masses are obtained or solutions which may be employed for the manufacture of films or foils and artificial threads or for impregnating fibrous materials of any kind and particularly for coating solid articles, especially those from metals such as iron and alloys thereof.

The quantity employed of the said reaction products may be varied with rather wide limits, depending on the addition of resins and on the desired application of the products, quantities of from about 5 to about 100 per cent by weight of the chlorinated materials being generally applied. If the final products are intended for use as hard artificial masses of substantial size and volume the quantity of the said reaction products is generally lower than in the production of soft masses; if solutions for use as coating or impregnating materials be intended, the quantity of the said reaction products is generally between about 10 and about 60 per cent, quantities of from about 10 to about 40 per cent by weight of the chlorinated rubber materials being usually sufficient for the last-mentioned purposes. Solvents suitable for the said purposes are usually chosen from those consisting of, or essentially containing liquid hydrocarbons especially those of the aromatic series. If desired, the usual additions of compatible resins, such as ester gum, high and low melting polymerization products of cumaron or of cyclohexanone and its homologues, copals solubilized by melting, or alkyd resins, of fillers and/or coloring materials may be made.

The compositions prepared according to the present invention and coatings therefrom are insensitive against the attack of acids, alkalies and oxidizing agents and do not show blisters or even peel off from a solid basis, such as metal, concrete, wood, etc. when subjected to the extended action of the water of rivers or of the sea. These valuable properties may be still further increased by adding small quantities of fatty acids of high molecular weight as, for example, the acids of natural fats or oils, such as stearic acid. The quantity employed of these fatty acids may be, for example, from about 0.5 to about 3 per cent by weight of the chlorinated rubber materials.

The following examples will further illustrate how the present invention may be carried out in practice, but the invention is not limited thereto and may be easily modified in any usual and convenient manner. The parts are by weight.

Example 1

25 parts of chlorinated India rubber, having a content of chlorine of 64% by weight, and 6 parts of the oil obtained according to Example 1 of the German Patent 365,169 are dissolved in 54 parts of xylene or in a mixture of 18 parts of toluene and 36 parts of xylene, the whole being then homogenized with 15 parts of titanium dioxide.

The varnish obtained is painted twice or three times on sheet iron freed from rust. A strongly adhering coating is obtained, which is highly resistant to mechanical attack and does not form blisters when submerged in water of any kind.

The oily softening agent made use of as described above is prepared in the following manner:—1000 parts of toluene, 330 parts of sulfur and 80 parts of aluminium chloride are slowly heated to boiling while refluxing and kept boiling until the evolution of hydrogen sulfide and gaseous hydrochloric acid has ceased. The mixture is then poured into hot water in order to eliminate the excess of aluminium chloride. The oily reaction product is then separated from the water, dried and fractionated in vacuo. After the excess of toluene has been distilled off there are obtained about 500 parts of a yellow oil, which has a boiling point of about 150–230° C. at 3 mm. pressure. The disagreeable odor of the oil can be removed by alkali lye.

Example 2

50 parts of chlorinated rubber, having a content of chlorine of 55 per cent by weight, are kneaded at about 100° C. with from 20–25 parts of the oil referred to in Example 1, the whole being then homogenized, if necessary, on hot rollers. The homogeneous mass, which may be colored by the addition of pigments may be used for moulding purposes.

Example 3

Iron pipes or other articles from iron are freed from rust and, if desired, primed with a primer from linseed oil and minium. A coating composition consisting of 25 parts of chlorinated rubber, having a content of chlorine of from 55 to 60 per cent by weight, 8 parts of the oil obtained according to Example 2 of the German Patent 365,169, from 0.3 to 0.4 part of stearic acid, 10 parts of slate meal, 6 parts of iron red, 12 parts of tuluene, 30 parts of xylene and 10 parts of solvent naphtha is then applied. Coatings are obtained, giving an excellent protection against a lasting action of water under the surface of rivers or of the sea.

Example 4

50 parts of chlorinated rubber, having a content of chlorine of about 63 per cent, are homogeneously worked, while warming, with 20 parts of the oil referred to in Example 1, and 30 parts of a low-melting resin prepared by the polymerization of cumarone. If desired, inorganic or organic pigments or soluble dyestuff may be incorporated during the homogenization.

What we claim is:—

1. A composition essentially comprising a chlorinated rubber material and a sulfur-bearing product from the interaction of sulfur and at least one aliphatic homologue of benzene selected from the group consisting of toluene, xylene and ethylbenzene in the presence of aluminium chloride.

2. A composition essentially comprising chlorinated rubber and from about 5 to about 100 per cent of its weight of a sulfur-bearing product from the interaction of sulfur and at least one aliphatic homologue of benzene selected from the group consisting of toluene, xylene and ethylbenzene in the presence of aluminium chloride.

3. A composition essentially comprising chlorinated rubber and from about 5 to about 100 per cent of its weight of a sulfur-bearing oily product from the interaction of sulfur and at least one aliphatic homologue of benzene selected from the group consisting of toluene, xylene and ethylbenzene containing from 1 to 2 alkyl groups, in the presence of aluminium chloride.

4. A composition essentially comprising chlorinated rubber and from about 10 to 60 per cent of its weight of a sulfur-bearing oily product from the interaction of sulfur and toluene in the presence of aluminium chloride.

5. A coating composition essentially comprising a chlorinated rubber containing from about 55 to about 65 per cent of chlorine and a sulfur-bearing oily product from the interaction of sulfur and toluene in the presence of aluminium chloride and a hydrocarbon solvent.

LEO ROSENTHAL.
REINHARD HEBERMEHL.